(12) United States Patent  (10) Patent No.: US 7,414,777 B2
Machida et al.  (45) Date of Patent: Aug. 19, 2008

(54) IMAGE DISPLAY MEDIUM, AND IMAGE DISPLAY DEVICE EQUIPPED WITH THE IMAGE DISPLAY MEDIUM

(75) Inventors: Yoshinori Machida, Kanagawa (JP); Yasufumi Suwabe, Kanagawa (JP); Hiroaki Moriyama, Kanagawa (JP); Yoshiro Yamaguchi, Kanagawa (JP); Takeshi Matsunaga, Kanagawa (JP); Atsushi Hirano, Kanagawa (JP); Kiyoshi Shigehiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 40 days.

(21) Appl. No.: 11/499,747

(22) Filed: Aug. 7, 2006

(65) Prior Publication Data

US 2007/0188848 A1 Aug. 16, 2007

(30) Foreign Application Priority Data

Feb. 10, 2006 (JP) ............................. 2006-033896

(51) Int. Cl.
G02B 26/00 (2006.01)
(52) U.S. Cl. .................................... 359/296
(58) Field of Classification Search ......... 359/265–275, 359/296; 345/105, 107
See application file for complete search history.

(56) References Cited

U.S. PATENT DOCUMENTS 6,870,661 B2 * 3/2005 Pullen et al. ................ 359/296
7,034,987 B2 * 4/2006 Schlangen .................. 359/296

FOREIGN PATENT DOCUMENTS

| JP | A 1-267525 | 10/1989 |
| JP | A 2001-31225 | 2/2001 |
| JP | A 2004-86095 | 3/2004 |

* cited by examiner

*Primary Examiner*—Ricky Mack
*Assistant Examiner*—Tuyen Q Tra
(74) *Attorney, Agent, or Firm*—Oliff & Berridge, PLC

(57) ABSTRACT

An image display medium has: a display substrate that is at least transparent; a back substrate opposing the display substrate with a gap therebetween; at least two or more kinds of moving particle groups that are chargeable and that are different colors, the moving particle groups being enclosed between the display substrate and the back substrate and moving between the substrates in accordance with an electric field formed between the substrates; a transparent liquid for dispersing the moving particles, the transparent liquid being enclosed between the display substrate and the back substrate; and a colored member disposed between the display substrate and the back substrate, and having gaps through which the moving particle groups can move, and being a color that is different from the colors of the moving particle groups.

14 Claims, 18 Drawing Sheets

IMAGE DISPLAY MEDIUM, AND IMAGE DISPLAY DEVICE EQUIPPED WITH THE IMAGE DISPLAY MEDIUM

BACKGROUND

1. Technical Field

The present invention relates to an image display medium and to an image display device equipped with the image display medium. In more detail, the present invention relates to an image display medium that carries out image display repeatedly by moving, by an electric field, charged particles that are enclosed between a surface substrate and a back substrate of the image display medium, and to an image display device that carries out image display repeatedly on the image display medium.

2. Related Art

Image display media using colored particles have conventionally been known as image display media that have a memory property and at which repeated re-writing is possible. Such an image display medium is structured to include, for example, a pair of substrates, and plural kinds of particle groups that have different colors and charge characteristics and that are enclosed between the substrates so as to be able to move between the substrates due to an applied electric field. Further, there are also cases in which gap members, for partitioning the region between the substrates into plural cells, are provided between the substrates for reasons such as preventing the particles from tending toward a partial region between the substrates, and the like.

In such an image display medium, the particles are moved by applying a voltage corresponding to an image to between the pair of substrates, and the image is displayed as the contrast of the particles of the different colors. Note that, even after the application of voltage is stopped, the particles remain adhered to the substrates due to van der Waals force and image force, and the image display is maintained.

In order to improve the color display ability in an image display medium of such a structure, in addition to color display by particles, using a colored back substrate and displaying the color of the back substrate.

Further, using a colored liquid as a liquid enclosed together with particles between substrates, and displaying the color of the colored liquid has been proposed.

SUMMARY

According to an aspect of an invention, there is provided an image display medium having: a display substrate that is at least transparent; a back substrate opposing the display substrate with a gap therebetween; at least two or more kinds of moving particle groups that are chargeable and that are different colors, the moving particle groups being enclosed between the display substrate and the back substrate and moving between the substrates in accordance with an electric field formed between the substrates; a transparent liquid for dispersing the moving particles, the transparent liquid being enclosed between the display substrate and the back substrate; and a colored member disposed between the display substrate and the back substrate, and having gaps through which the moving particle groups can move, and being a color that is different from colors of the moving particle groups.

BRIEF DESCRIPTION OF THE DRAWINGS

Embodiments of the present invention will be described in detail based on the following figures, wherein.

DETAILED DESCRIPTION

Figure 1:
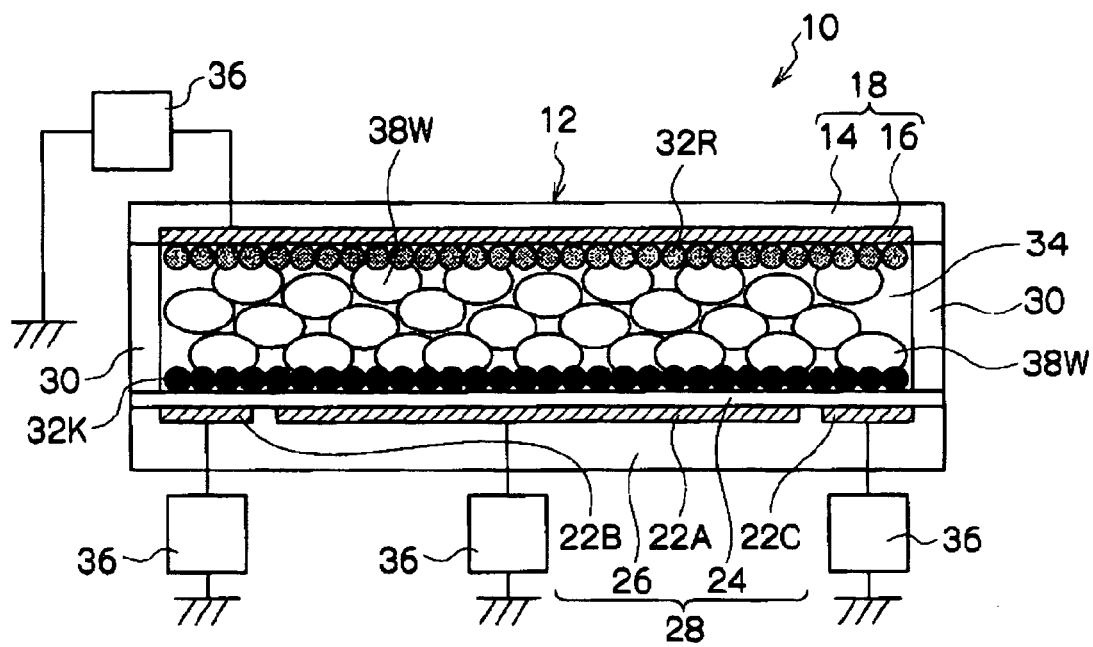
FIG. 1 is a schematic structural view showing an image display device relating to an exemplary embodiment.

An image display medium according to an aspect of the present invention has: a display substrate that is at least transparent; a back substrate opposing the display substrate with a gap therebetween; at least two or more kinds of moving particle groups that are chargeable and that are different colors, the moving particle groups being enclosed between the display substrate and the back substrate and moving between the substrates in accordance with an electric field formed between the substrates; a transparent liquid for dispersing the moving particles, the transparent liquid being enclosed between the display substrate and the back substrate; and a colored member disposed between the display substrate and the back substrate, and having gaps through which the moving particle groups can move, and being a color that is different from the colors of the moving particle groups.

In the image display medium according to an aspect of the present invention, the colored member can be disposed in a vicinity of the display substrate. Further, the depth from the display surface to the colored member can be made to be shallow, and the color of the colored member can be displayed as display of a color other than the colors of the moving particles. Further, the colored member has gaps through which the moving particle groups can move. Therefore, when carrying out display by the moving particles, the colored member is shielded by the moving particles.

There may be no need to color the liquid in which the moving particles are dispersed. Therefore, color display by the particles may be repeatedly carried out stably over a long period of time.

In the image display medium according to an aspect of the present invention, the colored member can be structured by a colored particle group whose particles have a volume average particle diameter larger than the volume average particle diameter of particles of the moving particle groups.

In this case, a size of the particles of the colored particle group structuring the colored member may be greater than or equal to 10 times the size of the particles of the moving particle groups. Further, a surface roughness of the particles of the colored particle group structuring the colored member may be greater than a particle diameter of the moving particle groups.

Further, the particles of the colored particle group structuring the colored member may have attached thereto accessory particles whose particle diameter is smaller than a volume average particle diameter of the particles of the colored particle group and whose particle diameter is greater than a volume average particle diameter of the particles of the moving particle groups. Moreover, the particles of the colored particle group structuring the colored member may have attached thereto, at a covering ratio of 1% to 30%, accessory particles whose particle diameter is smaller than a volume average particle diameter of the particles of the colored particle group and whose particle diameter is greater than a volume average particle diameter of the particles of the moving particle groups.

Further, a transparent porous member, which has throughholes through which the moving particle groups can move, can be disposed between the display substrate and the colored particle group structuring the colored member.

In the image display medium according to an aspect of the present invention, the colored member can be structured by a porous member having through-holes through which the moving particle groups can move.

In the image display medium according to an aspect of the present invention the colored member can be disposed so as to abut the display substrate, or can be disposed with a gap between the colored member and the display substrate.

In the image display medium according to an aspect of the present invention, the colored member may be disposed so as to move in accordance with an electric field formed between the substrates.

In the image display medium according to an aspect of the present invention, the combination of the colors of the respective members can be as follows for example a combination in which the color of the colored member is white, and, when there are two kinds of the moving particle groups, the colors thereof are black and a chromatic color a combination in which the color of the colored member is black, and, when there are two kinds of the moving particle groups, the colors thereof are white and a chromatic color a combination in which the color of the colored member is a chromatic color, and, when there are two kinds of the moving particle groups, the colors thereof are white and black Moreover, when the image display medium is sectioned into at least three cells, combinations of chromatic colors of the moving particles and the colored member in the three cells may be combinations of red, green and blue, or combinations of yellow, magenta and cyan.

An image display device according to an aspect of the present invention has: the above-described image display medium according to an aspect of the present invention; a first electrode disposed at a display substrate side; a second electrode disposed at a back substrate side; and voltage applying unit for applying voltage between the first electrode and the second electrode and forming an electric field between the substrates.

The present invention will be described in detail hereinafter with reference to the drawings. Note that members having substantially the same functions are denoted by the same reference numerals throughout all of the drawings, and repeat description thereof may be omitted.

Figure 2:
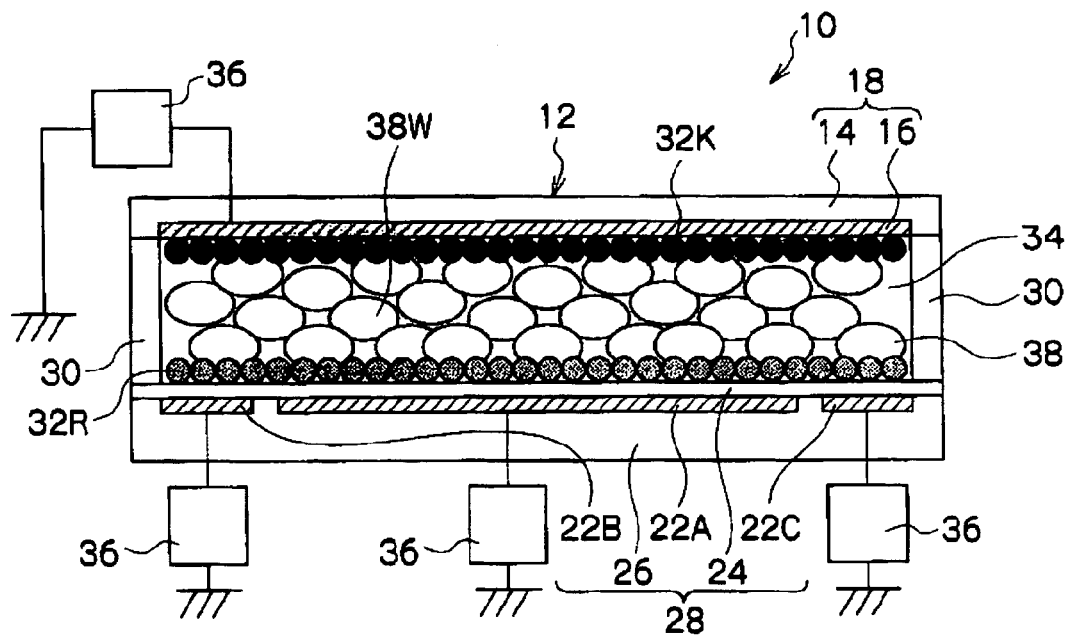
FIG. 2 is a schematic structural view showing the image display device relating to the exemplary embodiment.
Figure 3:
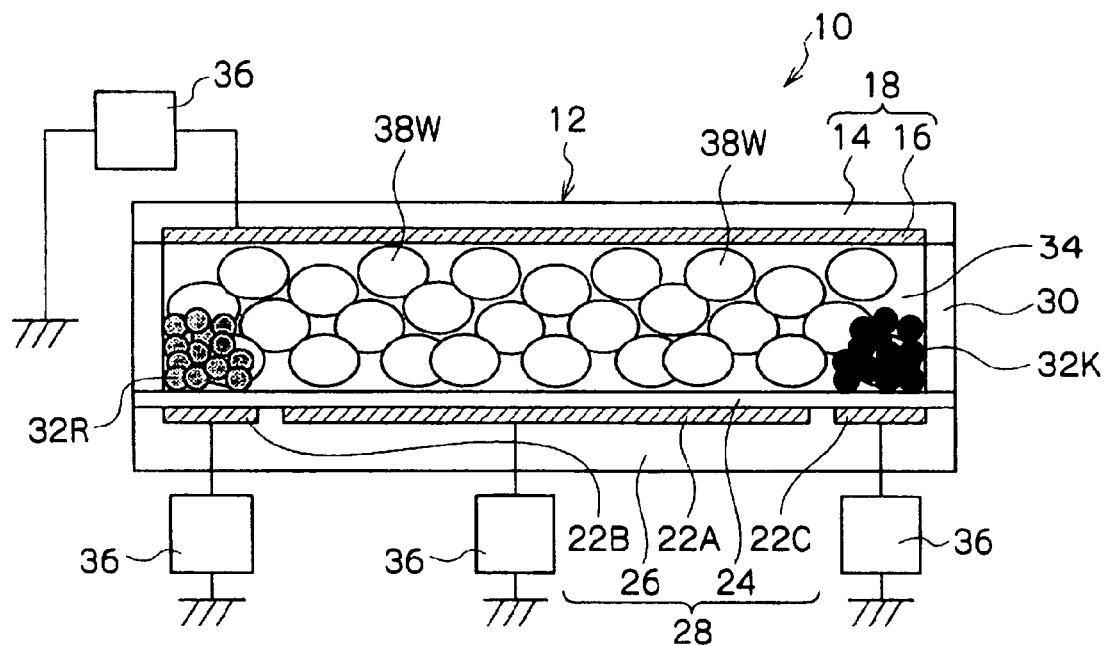
FIG. 3 is a schematic structural view showing the image display device relating to the exemplary embodiment.

FIGS. 1 through 3 are schematic structural views showing an image display device relating to an exemplary embodiment. FIG. 1 is a view showing red display by red particles, FIG. 2 is a view showing black display by black particles, and FIG. 3 is a view showing white display by large-diameter white particles that serve as a colored member.

As shown in FIGS. 1 through 3, an image display device 10 relating to the exemplary embodiment has an image display medium 12 structured to include a display substrate 18 at which a transparent electrode 16 (first electrode) is formed on a transparent base plate 14; a back substrate 28 disposed so as to oppose the display substrate 18 with a gap therebetween, and at which plural electrodes 22A, 22B, 22C (called "electrodes 22" on occasion hereinafter) and an insulating layer 24 are formed in order on a base plate 26; and gap members 30 that partition the region between the substrates into plural cells.

Black particles 32K (moving particles) that are charged positive, red particles 32R (moving particles) that are charged negative, and a dispersing liquid (transparent liquid) 34 that is transparent, are enclosed within the cells formed between the display substrate 18 and the back substrate 28. These move electrophoretically between the substrates due to the electric field formed between the substrates.

Black pigment particles such as carbon black, manganese ferrite black, titanium black, and the like can be used for the black particles 32K. Quinacridone red, cadmium red, lake red, and the like can be used as the red particles 32R.

The volume average particle diameter of the moving particles, which are the black particles 32K and the red particles 32R and the like, is generally 0.01 to 10 µm, and preferably 0.03 to 3 µm. If the volume average particle diameter of the moving particles is smaller than the above range, there are cases in which the charge amount of the moving particles is small, and the speed of moving through the transparent liquid is slow. Namely, there are cases in which the display responsiveness deteriorates extremely. Conversely, if the volume average particle diameter of the moving particles is greater than the aforementioned range, although the following ability is good, it may be easy for precipitation due the weight of the moving particles themselves and deterioration in the memory property to occur. Further, particles whose diameter is one digit or more higher than that of the moving particles must be used for the large-diameter white particles 38W. Therefore, the gap between the display electrode 18 and the back electrode 28 must be made to be large, and the display responsiveness may deteriorate, and the driving voltage for moving the particles may become high.

A highly-insulating, colorless, transparent liquid may be used as the dispersing liquid 34 that is transparent. For example, hydrocarbon solvents such as isoparaffin, silicon, toluene, xylene, normal paraffin, and the like can be used.

An electric field is formed between the substrates of the image display medium 12. Namely, the image display medium 12 has a voltage applying section 36 for applying voltage between the electrodes. The transparent electrode 16 and the electrodes 22A, 22B, 22C are respectively connected to the voltage applying section 36, and desired voltages are applied in accordance with image information.

Note that FIGS. 1 through 3 show one cell in order to simplify the drawings and explanation.

Figure 4:
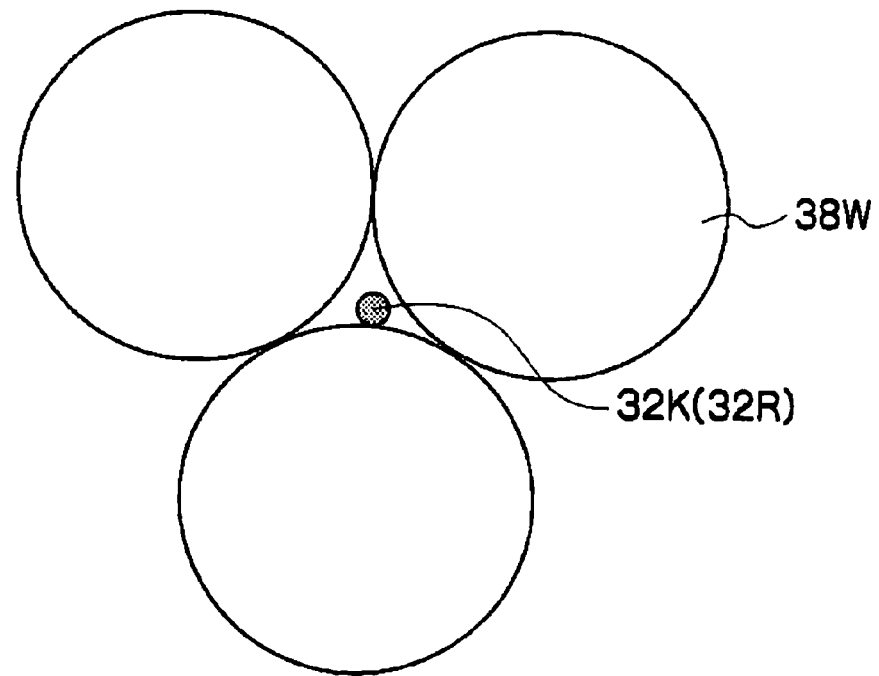
FIG. 4 is a schematic drawing showing the difference in sizes of large-diameter white particles (a colored member) and moving particles.

In the image display device 10 relating to the present exemplary embodiment, the large-diameter white particles 38W, which have larger particle diameters than the black particles 32K and the red particles 32R, are enclosed as a colored member in the cells formed between the display substrate 18 and the back substrate 28 structuring the image display medium 12. As shown in FIG. 4, the black particles 32K and the red particles 32R pass through the gaps formed by the large-diameter white particles 38W, and can move between the substrates.

The large-diameter white particles 38W are a colored member that displays a color different from the colors by the moving particles (the black particles 32K and the red particles 32R). In the present exemplary embodiment, the colored member is white, but the colored member is not limited to this color.

As shown in FIG. 4, particles whose particle diameter is larger than those of the moving particles (the black particles 32K and the red particles 32R) are used as the large-diameter white particles 38W. For the moving particles are able to move through the gaps between the large-diameter white particles 38W, particles whose particle diameter is 10 times or more (and preferably 20 times or more) greater than those of the moving particles (the black particles 32K and the red particles 32R) may be used as the large-diameter white particles 38W. However, because the large-diameter white particles 38W are enclosed between the substrates, the particle diameter thereof may be smaller than the distance between the substrates.

In cases in which the diameters of the moving particles are substantially uniform, it suffices for the size of the large-diameter white particles 38W to be 10 times greater or more than that of the moving particles. However, in cases in which there is dispersion in the diameters of the moving particles and larger moving particles are included, the size of the large-diameter white particles 38W being 20 times greater or more eliminates clogging of the moving particles between the colored member (the large-diameter white particles 38W).

If the particle diameter of the large-diameter white particles 38W is too small, there are cases in which gaps between the particles, through which the moving particles can move, cannot be sufficiently ensured. Further, if the particle diameter is too large, the gap between the substrates becomes large, and there are cases in which the structure becomes high voltage and deterioration in the display speed arises. Note that, if the volume average particle diameter of the large-diameter white particles 38W is around 10 µm, moving particles of a volume average particle diameter of several tens of nm can move through the gaps between the large-diameter white particles 38W.

Here, in the present exemplary embodiment, particles whose volume average particle diameter is 0.05 µm are used as the moving particles (the black particles 32K and the red particles 32R), and particles whose volume average particle diameter is 10 µm are used as the large-diameter white particles 38W.

For example, particles in which a white pigment such as titanium oxide, silicon oxide, zinc oxide, or the like is dispersed in polystyrene, polyethylene, polypropylene, polycarbonate, PMMA, an acrylic resin, a phenol resin, a formaldehyde condensate, or the like can be used as the large-diameter white particles 38W. In cases in which particles that are other than white are used as the particles structuring the colored member, for example, resin particles such as those described above that encapsulate a pigment or a dye of the desired color can be used. If the pigment or dye is, for example, a color among RGB or YMC, a general pigment or dye that is used in printing inks or color toners can be used.

The enclosing of the large-diameter white particles 38W (the colored member) between the substrates is carried out by, for example, an electrophotographic method, a toner jetting method or the like. Further, in a case of fixing the large-diameter white particles 38W (the colored member), the fixing can be carried out while maintaining the gaps between the particles by, for example, filling-in the large-diameter white particles 38W, and thereafter, carrying out heating (and pressurizing if needed), and melting a particle group surface layer of the large-diameter white particles 38W.

Note that the disclosure of JP-A No. 2001-31225 for example can be used as the details of the respective members structuring the image display medium 12 (other than the colored member).

Next, an image display method of the image display device 10 (image display medium 12) relating to the present exemplary embodiment will be described.

First, when voltage of +50V is applied to the transparent electrode 16 of the display substrate 18 and voltage of −50V is applied to the electrodes 22A, 22B, 22C of the back substrate 28, the black particles 32K that are charged positive move due to electrophoresis and adhere on the back substrate 28 (the electrodes 22A, 22B, 22C), and the red particles 32R that are charged negative move due to electrophoresis and adhere on the display substrate 18 (the transparent electrode 16). Accordingly, the red particles 32R that adhere on the display substrate 18 can be observed from the display substrate 18 side, and display of red color is carried out (see FIG. 1).

Further, when voltage of −50V is applied to the transparent electrode 16 of the display substrate 18 and voltage of +50V is applied to the electrodes 22A, 22B, 22C of the back substrate 28, the red particles 32R that are charged negative move due to electrophoresis and adhere on the back substrate 28 (the electrodes 22A, 22B, 22C), and the black particles 32K that are charged positive move due to electrophoresis and adhere on the display substrate 18 (the transparent electrode 16). Accordingly, the black particles 32K that adhere on the display substrate 18 can be observed from the display substrate 18 side, and display of black color is carried out (see FIG. 2).

Moreover, when voltage of 0V is applied to the transparent electrode 16 of the display substrate 18, voltage of 0V is applied to the electrode 22A of the back substrate 28, voltage of +50V is applied to the electrode 22B of the back substrate 28, and voltage of −50V is applied to the electrode 22C of the back substrate 28, the black particles 32K that are charged positive move due to electrophoresis and adhere on the electrode 22C of the back substrate 28, and the red particles 32R that are charged negative move due to electrophoresis and adhere on the electrode 22B of the back substrate 28. Accordingly, the large-diameter white particles 38W serving as the colored member can be observed from the display substrate 18 side, and display of white color is carried out (see FIG. 3).

In this way, in the present exemplary embodiment, display of three colors can be carried out at a single display unit.

Further, in the present exemplary embodiment, the large-diameter white particles 38W, which display a color other than the colors of the black particles 32K and the red particles 32R that serve as the moving particles, can be disposed in the vicinity of the display substrate 18, and the moving particles (the black particles 32K and the red particles 32R) can move through the gaps of the large-diameter white particles 38W. Therefore, when carrying out display by the black particles 32K and the red particles 32R, the large-diameter white particles 38W are shielded by the black particles 32K or the red particles 32R. Therefore, it is possible to carry out display of a color other than the particles, without dependency on brightness, saturation, or the visual field angle arising.

A modified example of the present exemplary embodiment will be described hereinafter.

Figure 5:
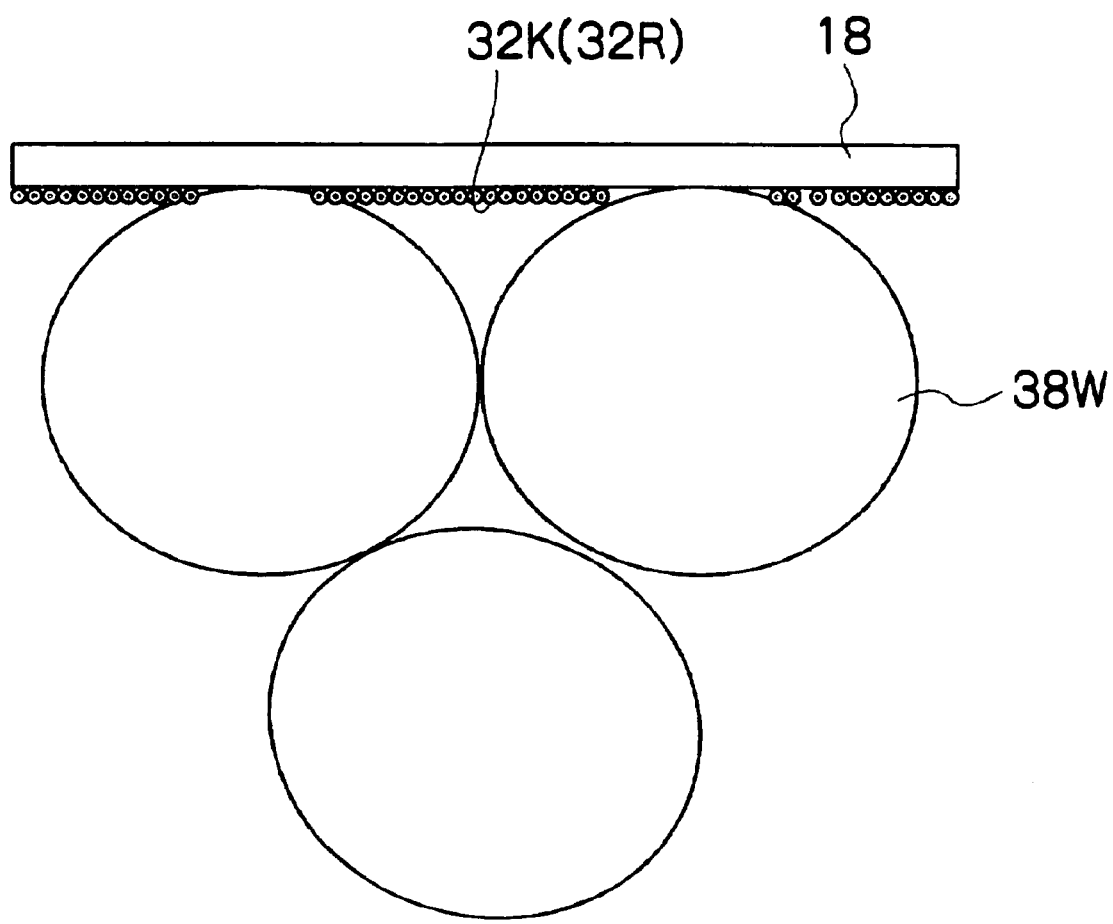
FIG. 5 is a schematic drawing showing a state in which the large-diameter white particles (the colored member) abut a surface substrate.

In the above-described exemplary embodiment, because the large-diameter white particles 38W serving as the colored member are enclosed between the substrates, as shown in FIG. 5, the large-diameter white particles 38W abut the display substrate 18. The surface area of contact thereof may be less than or equal to 10% (and preferably less than or equal to 3%) of the surface area of the display substrate 18 per unit cell. If this surface area of contact exceeds 10% of the surface area of the display substrate 18 per unit cell, the color of the portions of the large-diameter white particles 38W that abut the display substrate 18 is recognized, and there are cases in which color mixing occurs and the saturation deteriorates at the time of color display by the moving particles.

Here, the aforementioned surface area of contact being less than or equal to 10% does not present any great problems in cases in which white or black achromatic color particles are used as the moving particles. However, in cases in which chromatic color particles are used, although less than or equal to 10% is an allowable level, less than or equal to about 3% is preferable from the standpoint that color mixing is hardly felt at all.

Methods of reducing the surface area of contact of the large-diameter white particles 38W (the colored member) with the display substrate 18 include (1) a method of forming convex and concave portions at the surfaces of the large-diameter white particles 38W, (2) a method of attaching accessory particles to the large-diameter white particles 38W, (3) a method of placing a transparent porous member between the large-diameter white particles 38W and the display substrate 18, (4) a method of fixing and enclosing the large-diameter white particles 38W such that there is a gap between the large-diameter white particles 38W and the display substrate 18, (5) a method of placing the large-diameter white particles 38W in a suspended state, and the like.

Figure 6:
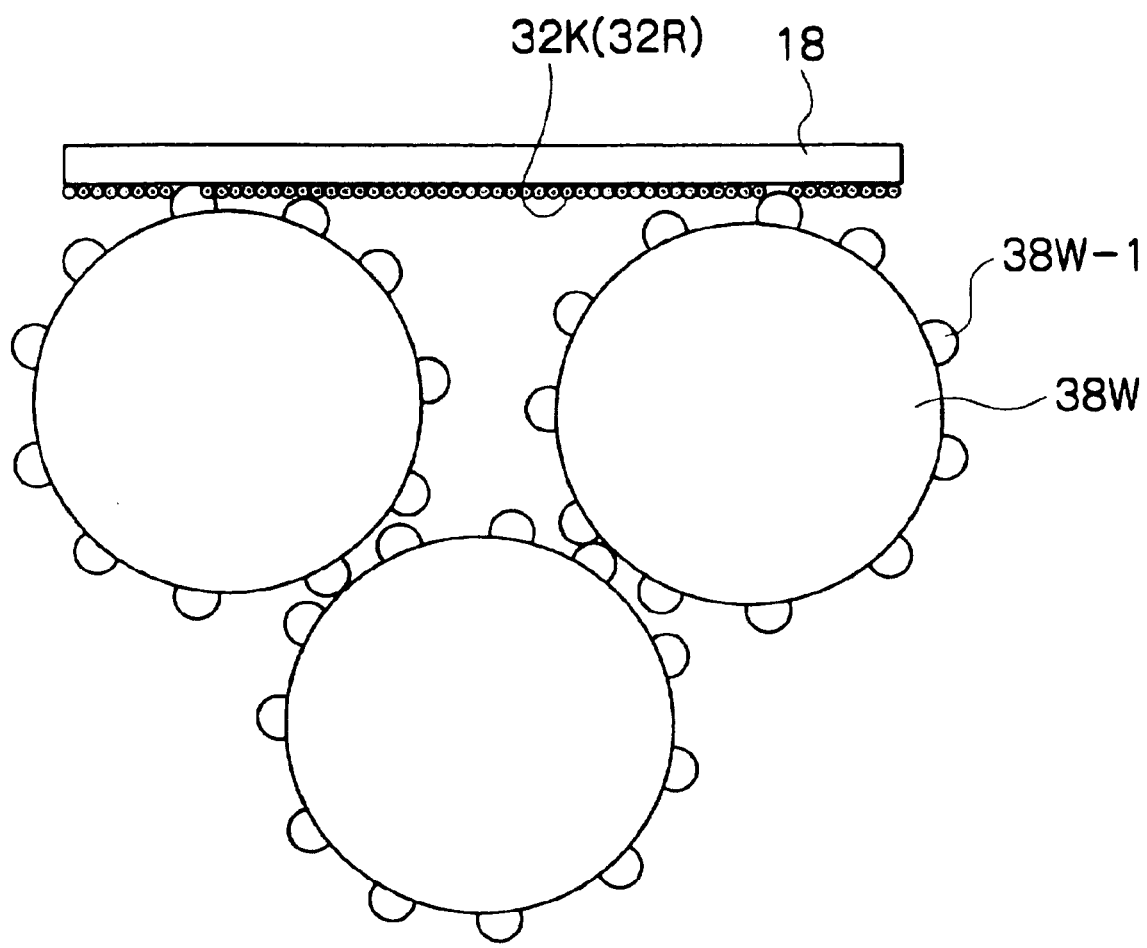
FIG. 6 is a schematic drawing showing a state in which the large-diameter white particles (a colored member) of another example abut the surface substrate.

In method (1), as shown in FIG. 6, by placing the large-diameter white particles 38W having convex and concave portions, convex portions 38W-1 of the large-diameter white particles 38W abut the display substrate 18, and the surface area of contact of the large-diameter white particles 38W (the colored member) with the display substrate 18 is reduced.

For example, particles in which are internally added internally-added particles whose volume average particle diameter is from greater than or equal to three times that of the moving particles to less than or equal to 1/10 that of the large-diameter white particles (e.g., particulates of titanium oxide or the like that is a white pigment or secondary cohered particles thereof, or, provided that the configuration at the time of manufacturing the large-diameter white particles is maintained, particulates of the above-described resins that structure the large-diameter white particles), or particles that makes resins such as those mentioned above into a porous state (e.g., Techpolymer MBP manufactured by Sekisui Plastics Co., Ltd.), or the like may be used as the large-diameter white particles 38W having convex and concave portions.

The surface roughness of the large-diameter white particles 38W having convex and concave portions may be greater than the particle diameter of the moving particles. This shows that the surface roughness of the large-diameter white particles 38W is greater than the volume average particle diameter of the moving particles.

The value of the surface roughness here is measured as follows. The surface roughness (ten-point average height) is determined by taking-in an SEM observed image of the particles and tracing the outer peripheral configurations of the particles by image processing.

Figure 7:
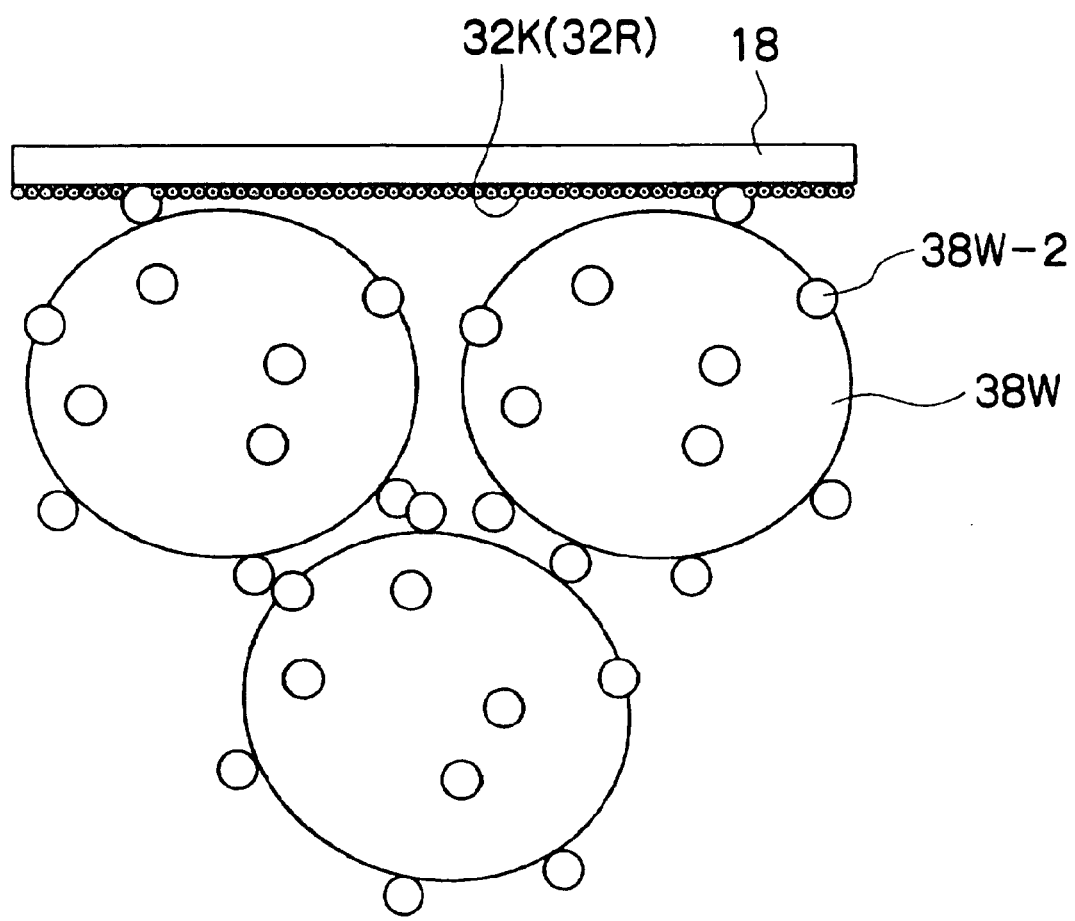
FIG. 7 is a schematic drawing showing a state in which the large-diameter white particles (a colored member) of yet another example abut the surface substrate.

In method (2), as shown in FIG. 7, accessory particles 38W-2 are attached to the large-diameter white particles 38W. In other words, by externally adding the accessory particles 38W-2, the accessory particles 38W-2 exist between the large-diameter white particles 38W and the display substrate 18. The large-diameter white particles 38W do not directly abut the display substrate 18, and the accessory particles 38W-2 abut the display substrate 18. Therefore, the surface area of contact of the large-diameter white particles 38W (the colored member) with the display substrate 18 is reduced.

Particles whose particle diameter is, in terms of the volume average particle diameter, greater than that of the moving particles and smaller that that of the large-diameter white particles 38W (the colored member) are used as the accessory particles 38W-2. Specifically, it is more preferable that the accessory particles 38W-2 be particles whose volume average particle diameter is greater than or equal to 3 times that of the moving particles and less than or equal to 1/20 of that of the large-diameter white particles.

The size of the accessory particles 38W-2 is, as a result, selected such that surface roughness of the large-diameter white particles 38W is at least greater than the volume average particle diameter of the moving particles, and a size such that the accessory particles 38W-2 cannot fill-in the gaps between the large-diameter white particles 38W may be selected. General methods are, for example, a method in which the accessory particles 38W-2 are mixed and stirred with the large-diameter white particles 38W in a stirring machine and the accessory particles 38W-2 are attached to the surfaces of the large-diameter white particles 38W, and thereafter, by heating to a temperature that is greater than or equal to the glass transition point of at least one of these kinds of particles, the particle surfaces are softened and fixed; and a method in which, by mixing and stirring the accessory particles 38W-2 with the large-diameter white particles 38W in a high-speed stirring machine, the accessory particles 38W-2 are fixed so as to be driven-into the surfaces of the large-diameter white particles 38W. In this case, the accessory particles 38W-2 are, to a certain extent, embedded in the surfaces of the large-diameter white particles 38W. Therefore, when this method is selected in advance, it is preferable that the particle diameter of the accessory particles 38W-2 be three times or more greater than that of the moving particles. Further, if the particle diameter is less than or equal to 1/20 of that of the large-diameter white particles 38W, the accessory particles 38W-2 do not fill-in the gaps between the large-diameter white particles 38W, and stable display may be carried out.

For example, resin particles that have a similar composition as the large-diameter white particles 38W and whose diameter is made to be small, or pigments such as titanium oxide and the like or secondary cohered particles thereof, or amorphous silica, or the like can be used as the accessory particles 38W-2.

The covering ratio of the accessory particles 38W-2 on the large-diameter white particles 38W (the colored member) is preferably 1% to 30%, and is more preferably 5% to 15%. By making the covering ratio be in the above range, the surface area over which the large-diameter white particles 38W abut the display substrate 18 may be reduced, and it is possible to prevent movement of the moving particles from being impeded by the accessory particles.

The covering ratio is measured as follows. The covering ratio is determined as the projected surface area ratio of the accessory particles with respect to the large-diameter white particles by image processing, by using an SEM observed image of the large-diameter white particles to which the accessory particles are attached.

Figure 8:
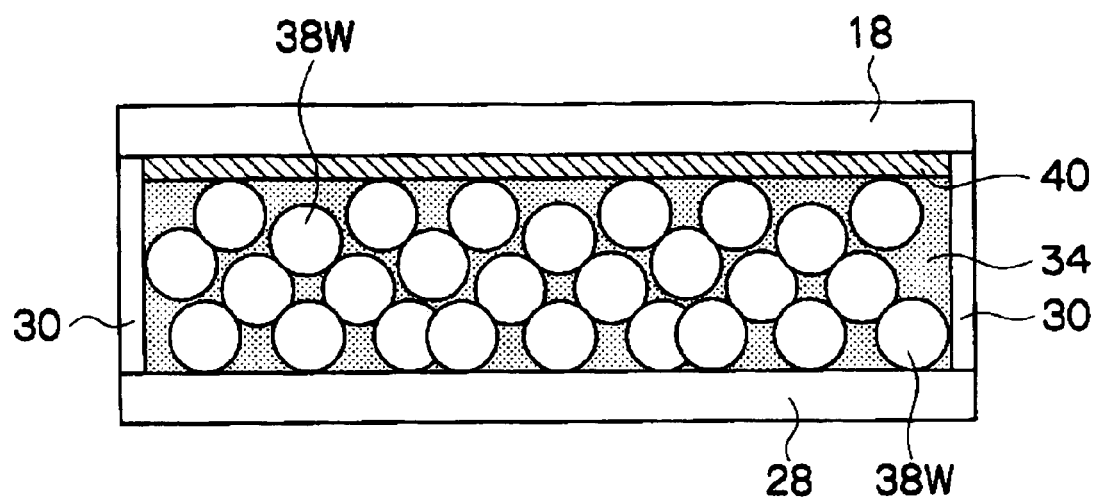
FIG. 8 is a schematic structural view showing another arrangement example of large-diameter white particles (a colored member)

In method (3), as shown in FIG. 8, by placing a transparent porous member 40 between the large-diameter white particles 38W and the display substrate 18, the large-diameter white particles 38W do not directly abut the display substrate 18, and the accessory particles 38W-2 abut the display substrate 18. Therefore, the surface area of contact of the large-diameter white particles 38W (the colored member) with the display substrate 18 is reduced.

The transparent porous member 40 is structured in the form of a layer, and the holes thereof are such that the moving particles can pass through the hole interiors and move toward the display substrate 18. Further, a member whose refractive index is equivalent to or near to that of the dispersing liquid 34 may be used as the transparent porous member 40. In this way, scattering reflection due to the refractive indices being different is suppressed, and deterioration in the visibility is prevented.

The thickness of the transparent porous member 40 may be a distance that is greater than or equal to the volume average particle diameter that is the particle diameter of the moving particles. In this way, the moving particles enter into the holes of the transparent porous member 40 and reach the display substrate 18 side, and a sufficient display density is realized.

For example, a porous substance such as gelatin or the like, or a polymer having a mesh structure such as porous silica or polyacrylamide or the like, or the like can be used as the transparent porous member 40. Further, the layer of the porous structure can be manufactured by using particles, which are formed of a thermoplastic transparent resin such as an acrylic resin or a styrene resin or the like and, for example, are about the same size as the large-diameter white particles, and lining-up a desired amount of these particles on the display substrate, and carrying out heating and fusing.

Figure 9:
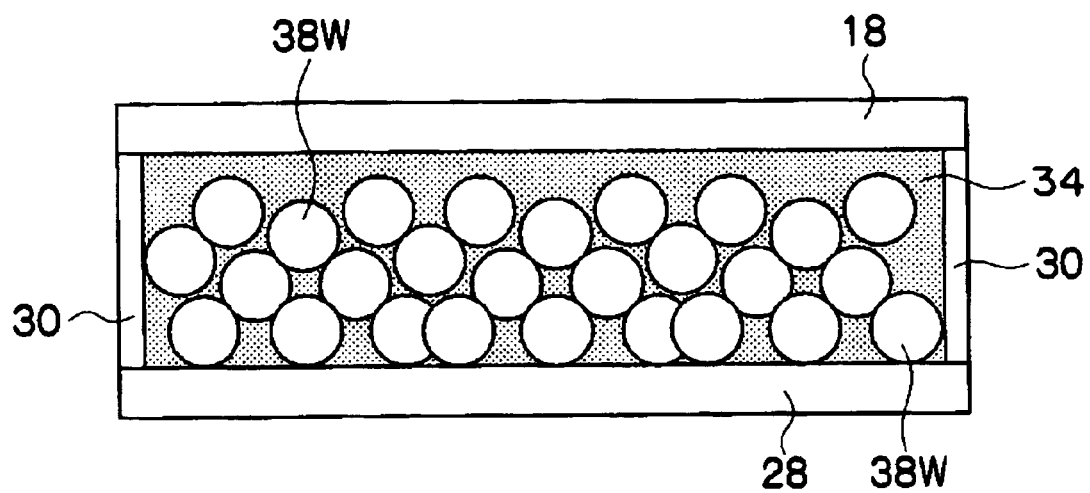
FIG. 9 is a schematic structural view showing yet another arrangement example of the large-diameter white particles (the colored member)

In method (4), as shown in FIG. 9, the large-diameter white particles 38W are fixed and enclosed such that there is a gap between the large-diameter white particles 38W and the display substrate 18. The large-diameter white particles 38W thereby do not abut the display substrate 18, and the surface area of contact of the large-diameter white particles 38W (the colored member) with the display substrate 18 is reduced.

The shortest distance of the distance of the gap between the large-diameter white particles 38W and the display substrate 18 may be a distance that is greater than or equal to the volume average particle diameter that is the particle diameter of the moving particles. In this way, the moving particles can enter into this gap and reach the display substrate 18 side, and a sufficient display density may be realized.

Figure 10:
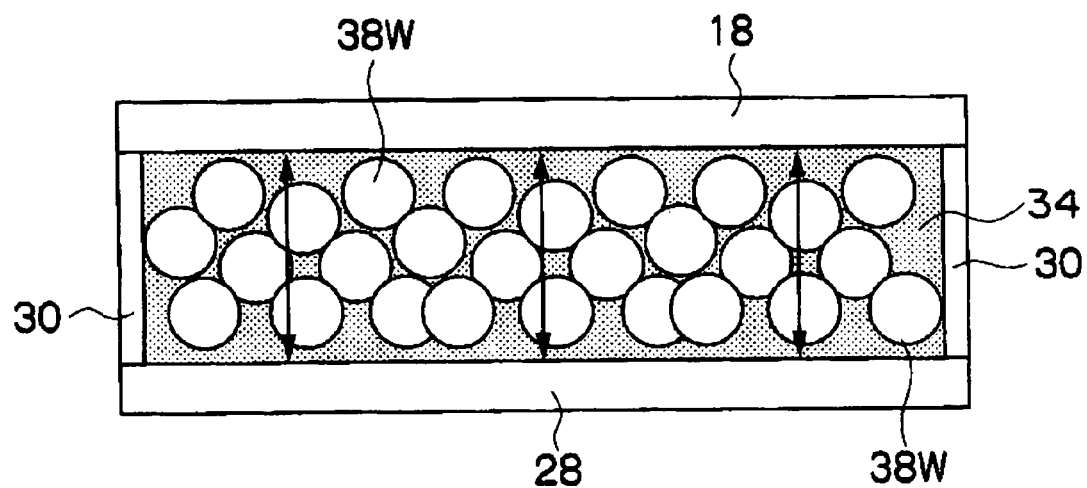
FIG. 10 is a schematic structural view showing still another arrangement example of the large-diameter white particles (the colored member)

In method (5), as shown in FIG. 10, by disposing the large-diameter white particles 38W in a suspended state, when the moving particles move toward the display substrate 18 side, they push the large-diameter white particles 38W away and reach the display substrate side. Therefore, the surface area of contact of the large-diameter white particles 38W (the colored member) with the display substrate 18 is reduced.

This method of disposing the large-diameter white particles 38W in a suspended state can be realized by, for example, enclosing the large-diameter white particles 38W in between the substrates at a lower filling ratio. The moving distance of the large-diameter white particles 38W is controlled by the extent of the filling ratio.

Further by charging the large-diameter white particles 38W (the colored member including a colored porous member that will be described later) to the same polarity as one kind of the moving particles, at the time when the other kind of the moving particles moves toward the display substrate 18, the large-diameter white particles 38W move toward the back substrate 28. As a result, at the time of color display by this other kind of moving particles, the large-diameter white particles 38W do not abut the display substrate 18, and the surface area of contact of the large-diameter white particles 38W (the colored member) with the display substrate 18 is reduced.

Note that FIGS. 6 and 7 are partial enlarged views of the peripheries of the colored particles (the large-diameter white particles). Further, in FIGS. 8 through 10, the electrodes, the moving particles, and the like are omitted.

The above-described exemplary embodiment describes a form in which the large-diameter white particles 38W that serve as the colored member are enclosed randomly. However, as shown in FIGS. 11 through 14, the large-diameter white particles 38W may be enclosed between the substrates such that the centers of the large-diameter white particles 38W are on the same plane. Note that the electrodes, the moving particles, and the like are omitted from FIGS. 11 through 14.

Figure 11:
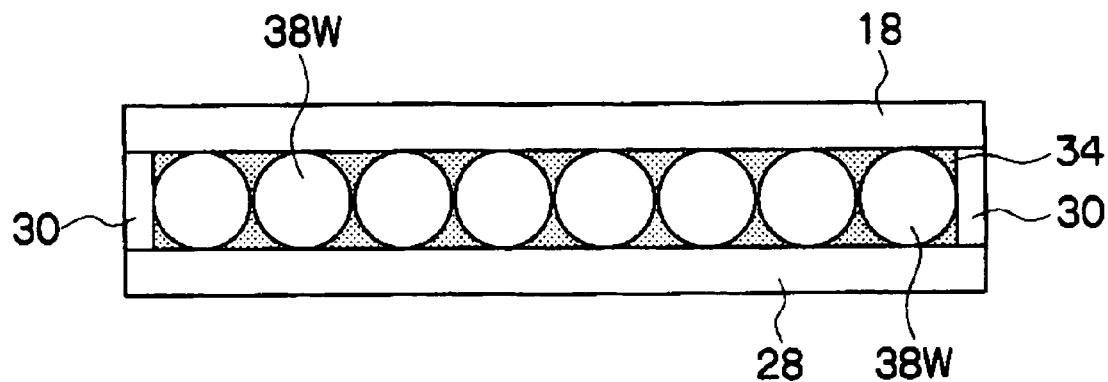
FIG. 11 is a schematic structural view showing still yet another arrangement example of the large-diameter white particles (the colored member)

The form shown in FIG. 11 is a form in which the large-diameter white particles 38W, which have particle diameters that are equivalent to the distance between the substrates, are enclosed in a state of being lined-up such that the centers thereof are on the same plane.

Figure 12:
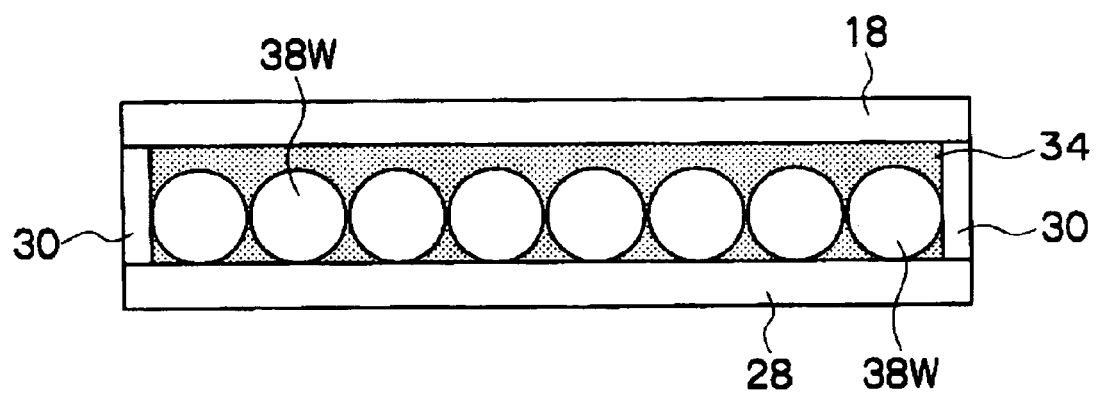
FIG. 12 is a schematic structural view showing another arrangement example of the large-diameter white particles (the colored member)

The form shown in FIG. 12 is a form in which the large-diameter white particles 38W, whose particle diameters are smaller than the distance between the substrates, are enclosed in a state of abutting and being fixed to the back substrate 28 such that there is a gap between the display substrate 18 and the large-diameter white particles 38W, with the large-diameter white particles 38W lined-up such that the centers thereof are on the same plane.

Figure 13:
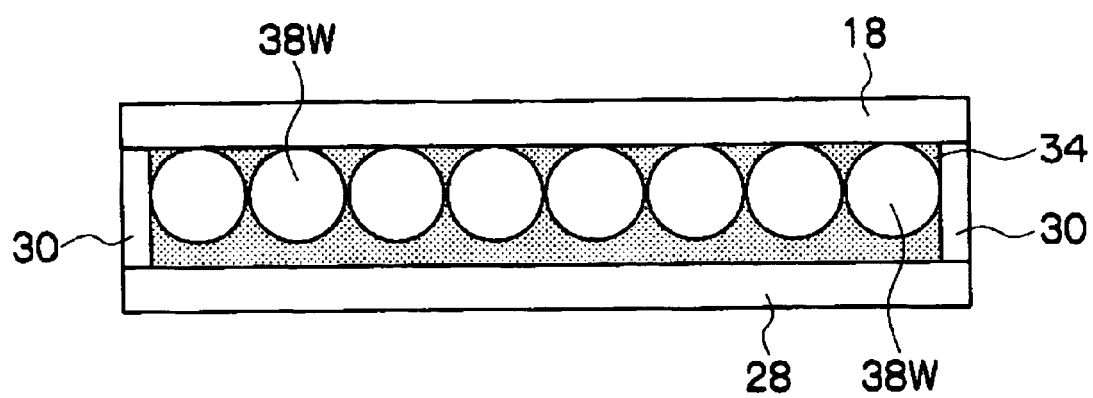
FIG. 13 is a schematic structural view showing still another arrangement example of the large-diameter white particles (the colored member)

The form shown in FIG. 13 is a form in which the large-diameter white particles 38W, whose particle diameters are smaller than the distance between the substrates, are enclosed in a state of abutting and being fixed to the display substrate 18, with the large-diameter white particles 38W lined-up such that the centers thereof are on the same plane.

Figure 14:
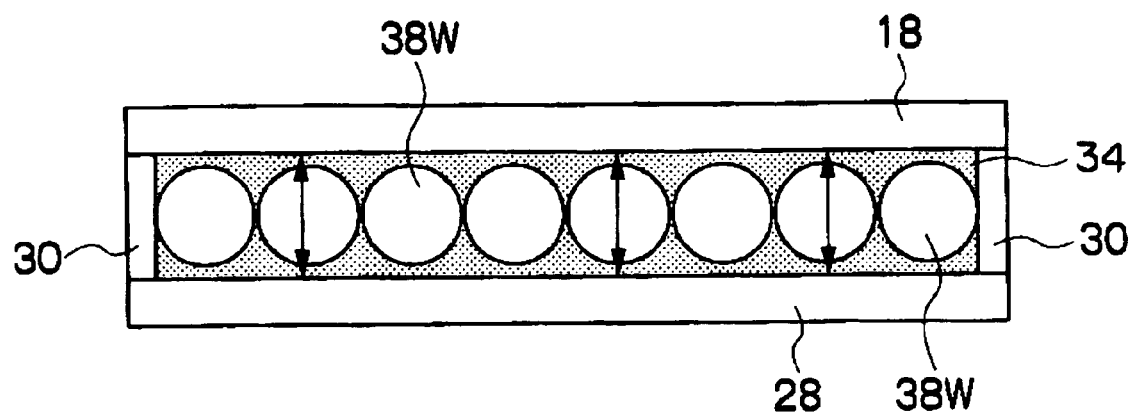
FIG. 14 is a schematic structural view showing yet another arrangement example of the large-diameter white particles (the colored member)

The form shown in FIG. 14 is a form in which the large-diameter white particles 38W, whose particle diameters are smaller than the distance between the substrates, are enclosed in a suspended state, with the large-diameter white particles 38W lined-up such that the centers thereof are on the same plane.

In the above-described exemplary embodiment, explanation is given of a form in which the large-diameter white particles 38W are enclosed as the colored member for displaying color other than those of the moving particles. However, as shown in FIGS. 15 through 19, a form may be utilized in which, for example, a colored porous member (e.g., a sponge mesh, a fiber net, or the like) is enclosed. Note that the electrodes, the moving particles, and the like are omitted from FIGS. 15 through 19.

The colored porous member has holes that communicate with both substrate side surfaces and are of a size such that the moving particles can move therethrough. The moving particles can move between the substrates through these holes. Further, both ensuring of the ability of the moving particles to shield the colored porous member, and a reduction in the contact surface area with the display substrate, may be achieved by making the porosity of the colored porous member at the side that abuts the display substrate higher than that at the other side. Further, white or a color other than white can be appropriately used as the color of the colored porous member.

Figure 15:
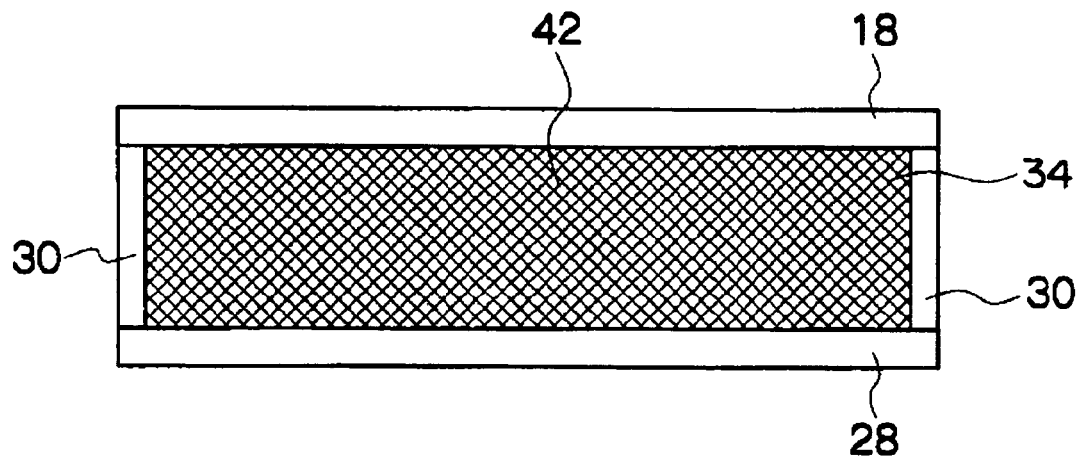
FIG. 15 is a schematic structural view showing an arrangement example of a colored porous member (a colored member)

The form shown in FIG. 15 is a form in which a colored porous member 42 is enclosed between the substrates without any gaps.

Figure 16:
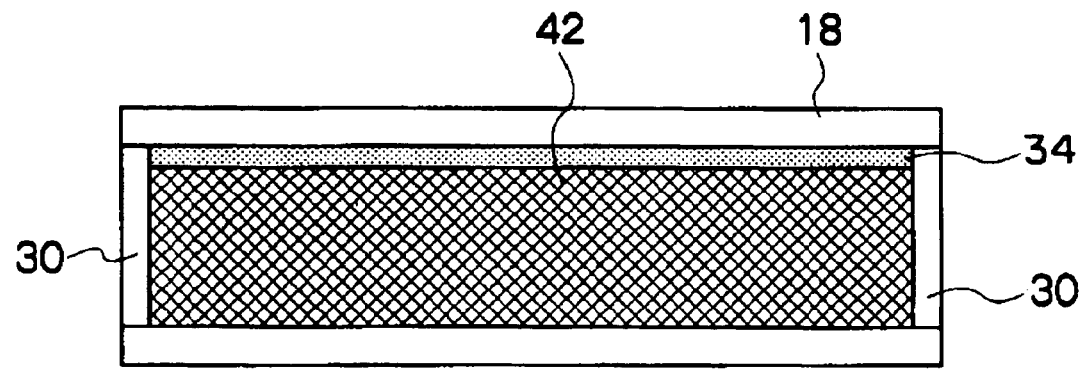
FIG. 16 is a schematic structural view showing another arrangement example of the colored porous member (the colored member)

The form shown in FIG. 16 is a form in which the colored porous member 42, whose thickness is smaller than the distance between the substrates, is enclosed in a state of abutting and being fixed to the back substrate 28 such that there is a gap between the colored porous member 42 and the display substrate 18.

Figure 17:
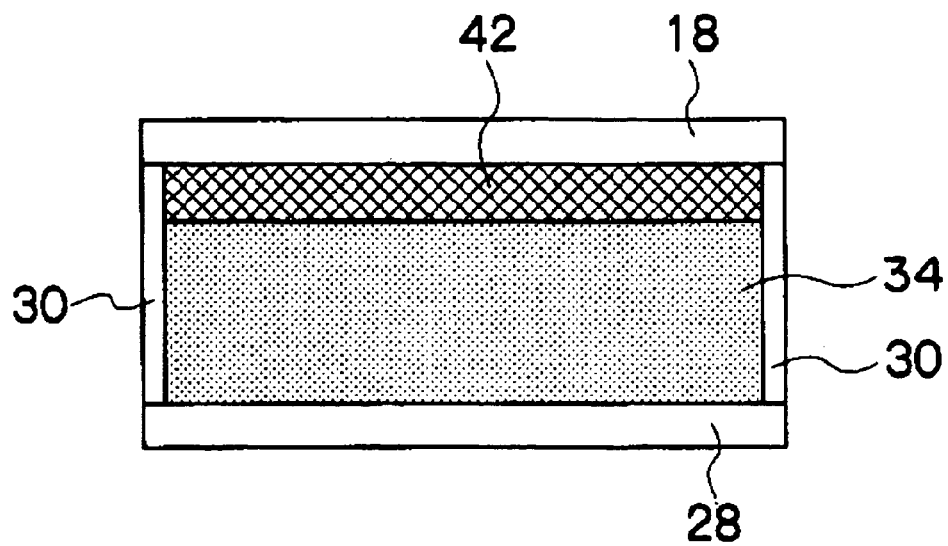
FIG. 17 is a schematic structural view showing yet another arrangement example of the colored porous member (the colored member)

The form shown in FIG. 17 is a form in which the colored porous member 42, whose thickness is smaller than the distance between the substrates, is enclosed in a state of abutting and being fixed to the display substrate 18.

Figure 18:
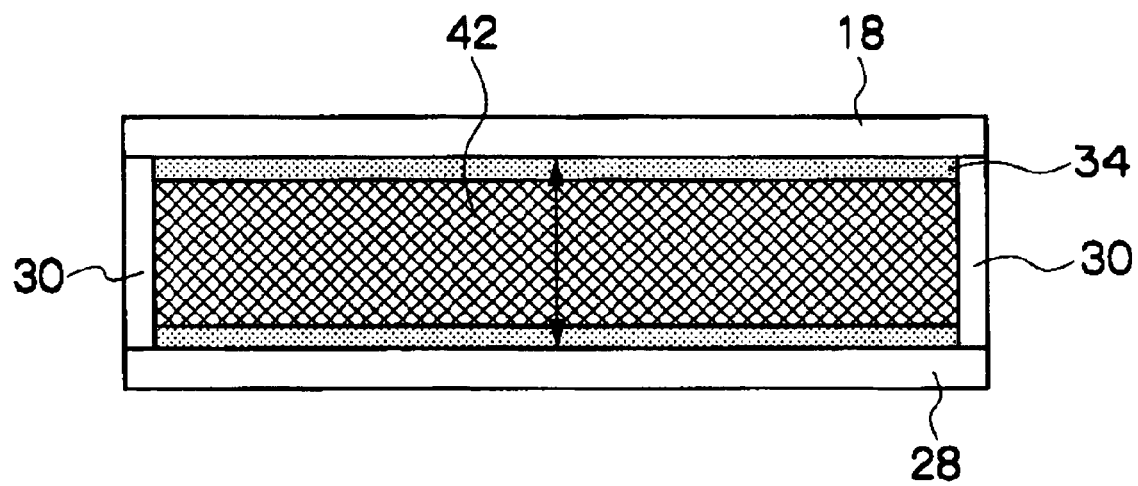
FIG. 18 is a schematic structural view showing still another arrangement example of the colored porous member (the colored member)

The form shown in FIG. 18 is a form in which the colored porous member 42, whose thickness is smaller than the distance between the substrates, is enclosed and fixed in a suspended state.

Figure 19:
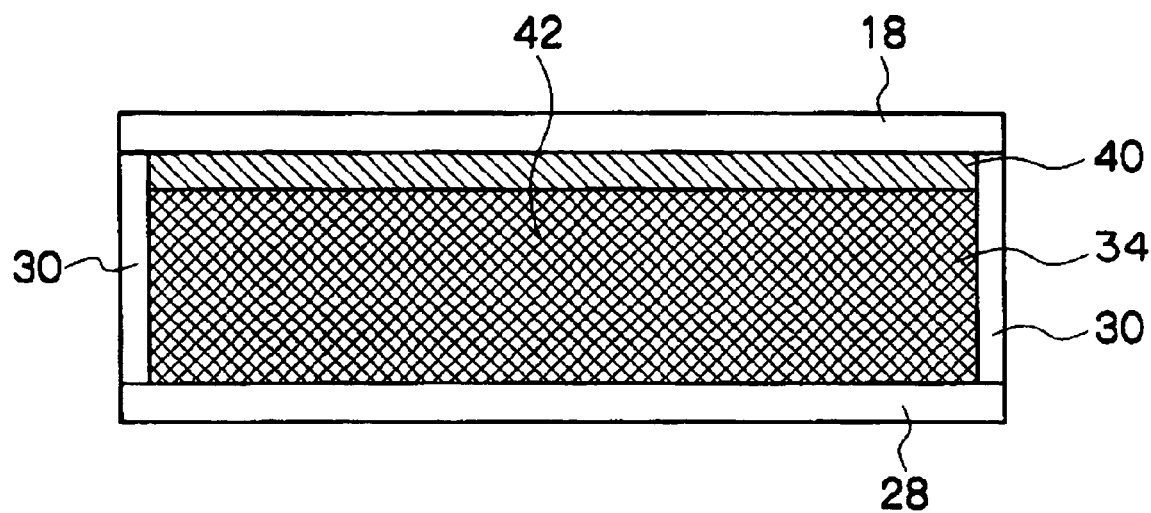
FIG. 19 is a schematic structural view showing still yet another arrangement example of the colored porous member (the colored member)

The form shown in FIG. 19 is a form in which the colored porous member 42 is enclosed with a transparent porous member 40 interposed between the colored porous member 42 and the display substrate 18.

Figure 20:
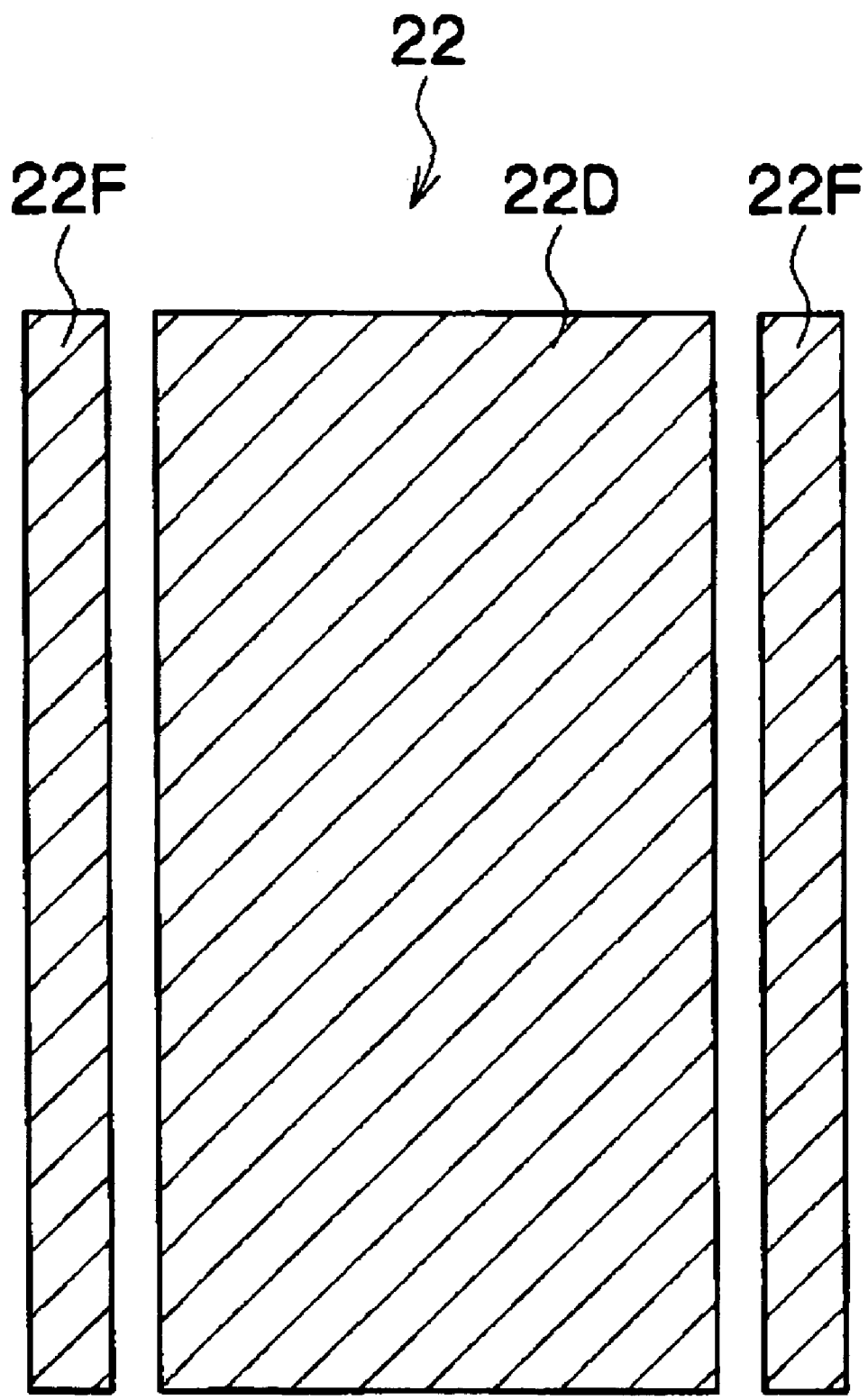
FIG. 20 is a plan view showing an electrode pattern of back electrodes.
Figure 21:
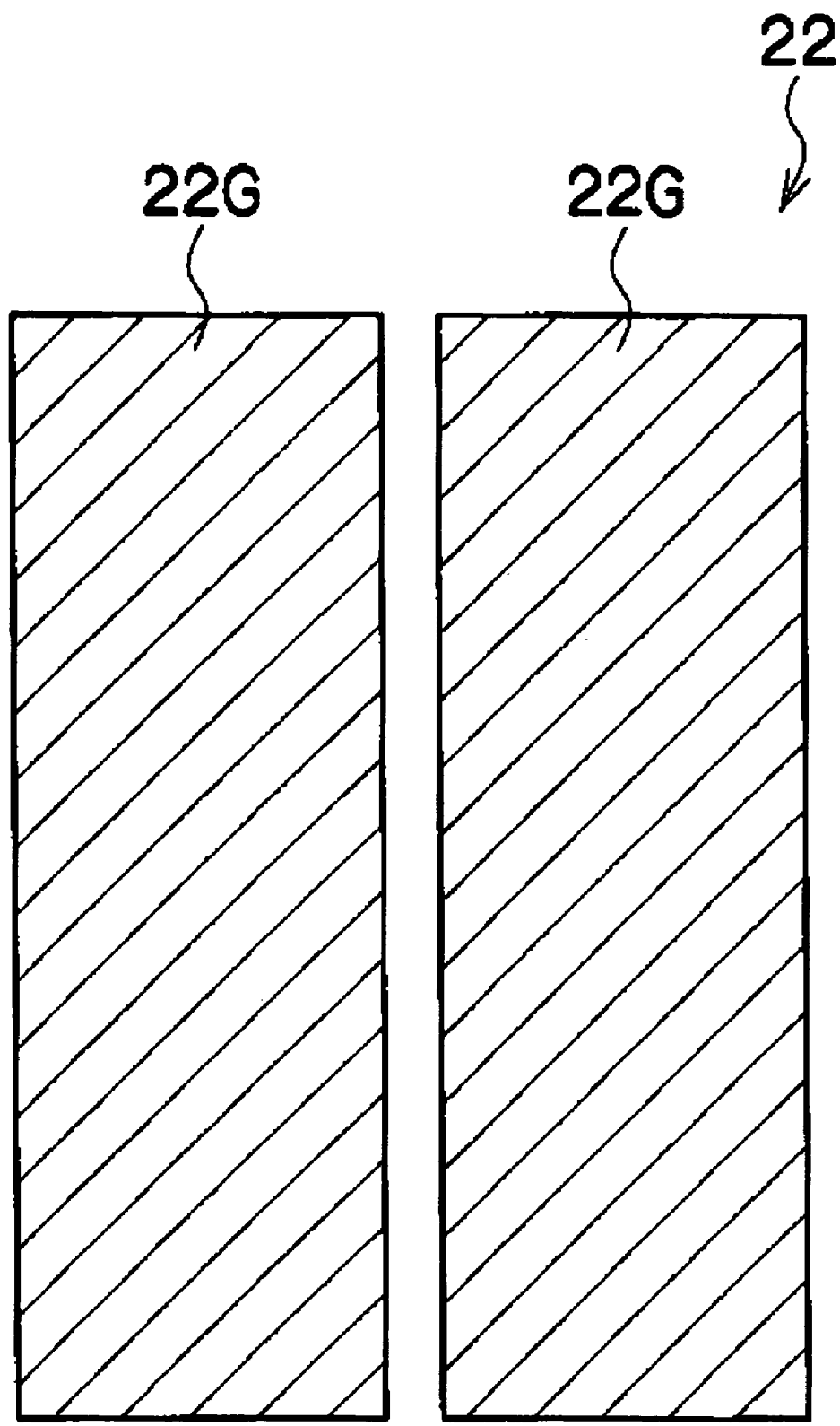
FIG. 21 is a plan view showing another example of an electrode pattern of back electrodes.
Figure 22:
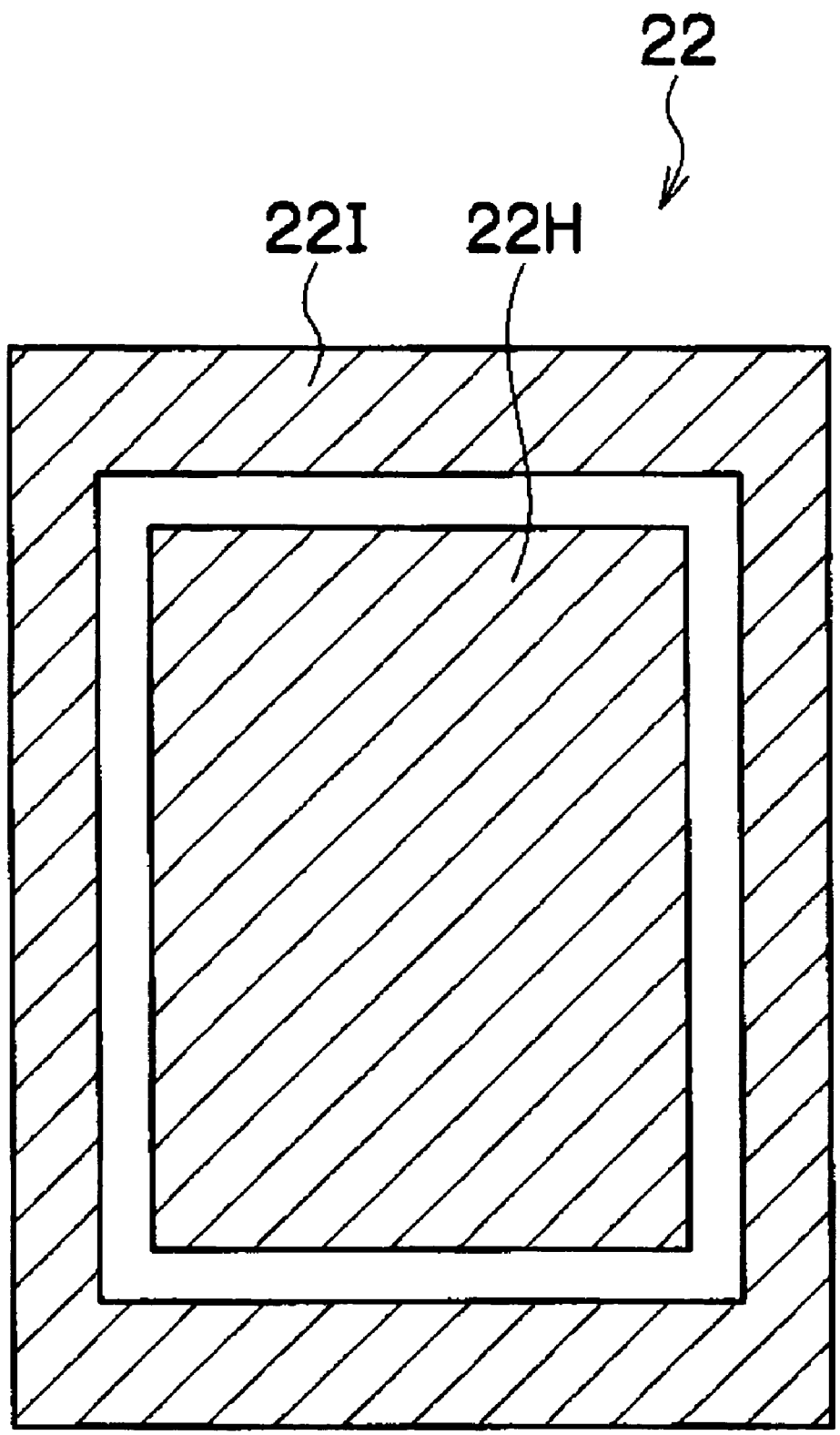
FIG. 22 is a plan view showing yet another example of an electrode pattern of back electrodes.
Figure 23:
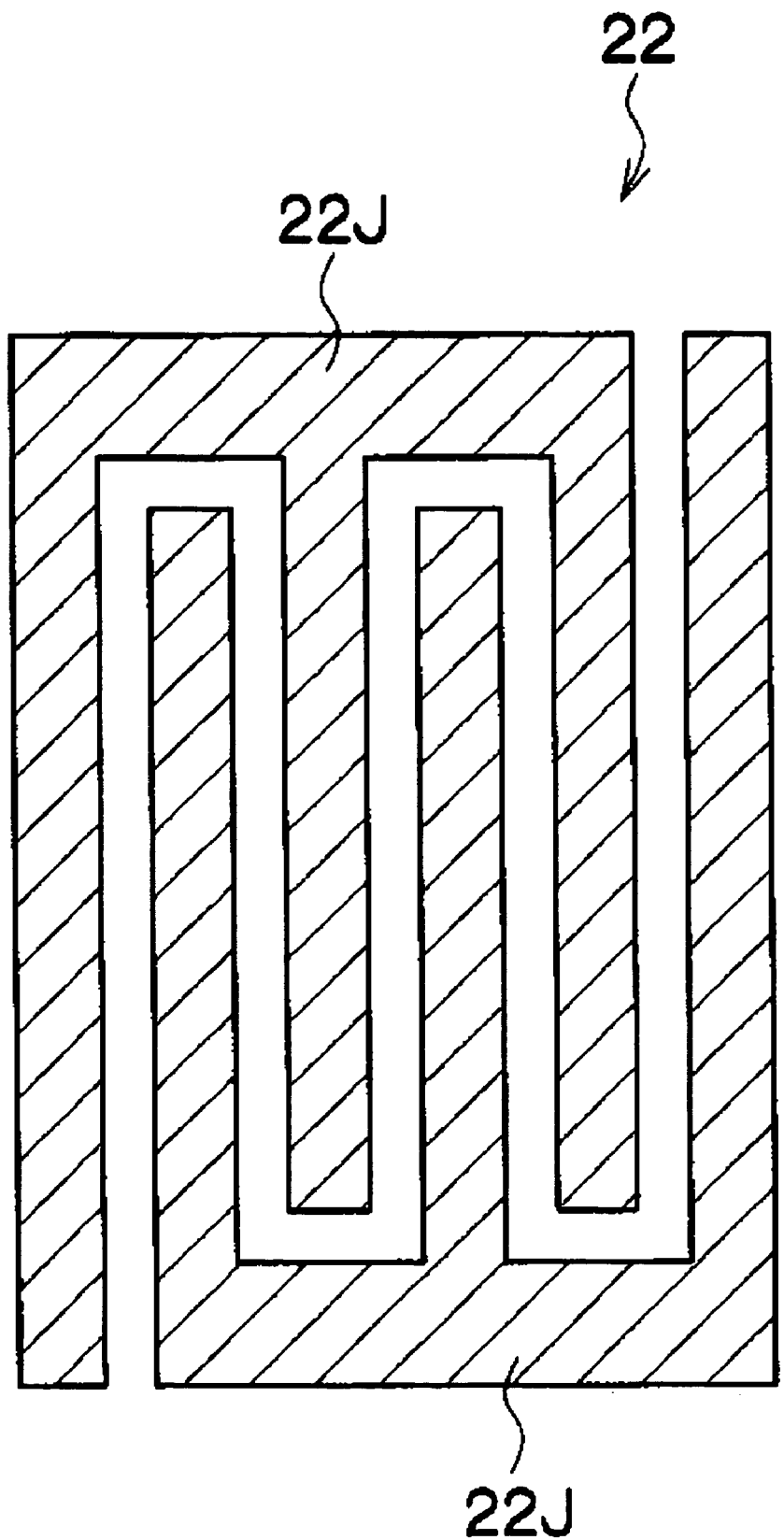
FIG. 23 is a plan view showing still another example of an electrode pattern of back electrodes.

In the above-described exemplary embodiment, because the moving particles are shielded by the colored member (the large-diameter white particles 38W) when the moving particles move toward the back substrate 28, electrodes of various patterns can be disposed as shown in FIGS. 20 through 23 for example, as the electrodes 22 (22A, 22B, 22C) of the back substrate 28. In particular, as shown in FIGS. 22 and 23, when the wire pitch of the electrodes 22 of the back substrate 28 is made to be small, the display speed and the moving particle clearing ratio of the display substrate 18 is improved.

Note that FIGS. 20 through 23 are plan views of electrode patterns of the back substrate.

The form shown in FIG. 20 is an electrode pattern structured by an electrode 22D shaped as a wide rectangle, and electrodes 22F that are shaped as narrow rectangles and are disposed at the sides of the both opposing long sides of the electrode 22D.

The form shown in FIG. 21 is an electrode pattern structured by two electrodes 22G of equivalent widths being lined-up in a row.

The form shown in FIG. 22 is an electrode pattern structured by a rectangular electrode 22H, and a frame-shaped electrode 22I disposed so as to surround the periphery of the electrode 22H.

The form shown in FIG. 23 is an electrode pattern structured such that two comb-shaped electrodes 22J are disposed so as to mesh together.

Combinations of colors at the image display medium 12 will be described hereinafter. In the above-described exemplary embodiment, description is given of a form combining the large-diameter white particles 38W as the colored member, and the black particles 32K and the red particles 32R as the moving particles. However, the present invention is not limited to the same, and combinations such as shown in FIGS. 24 and 25 may be used.

Figure 24:
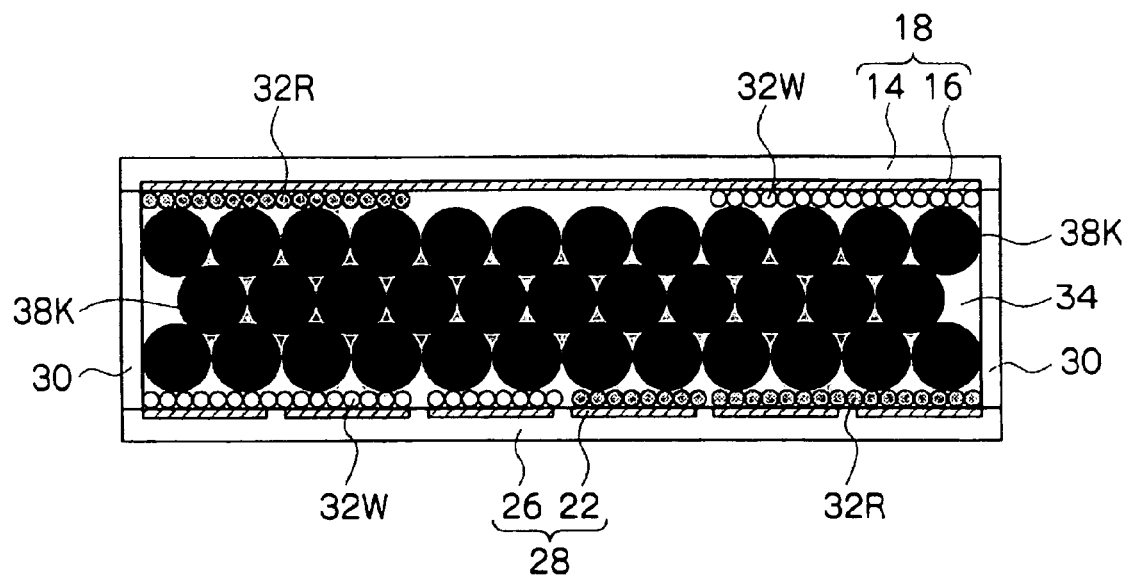
FIG. 24 is a schematic diagram showing an example of a combination of colors of the moving particles and the colored member of an image display medium in the case of black-and-white display.

The form shown in FIG. 24 is a form combining large-diameter black particles 38K as the colored member, and white particles 32W and the red particles 32R as the moving particles.

Figure 25:
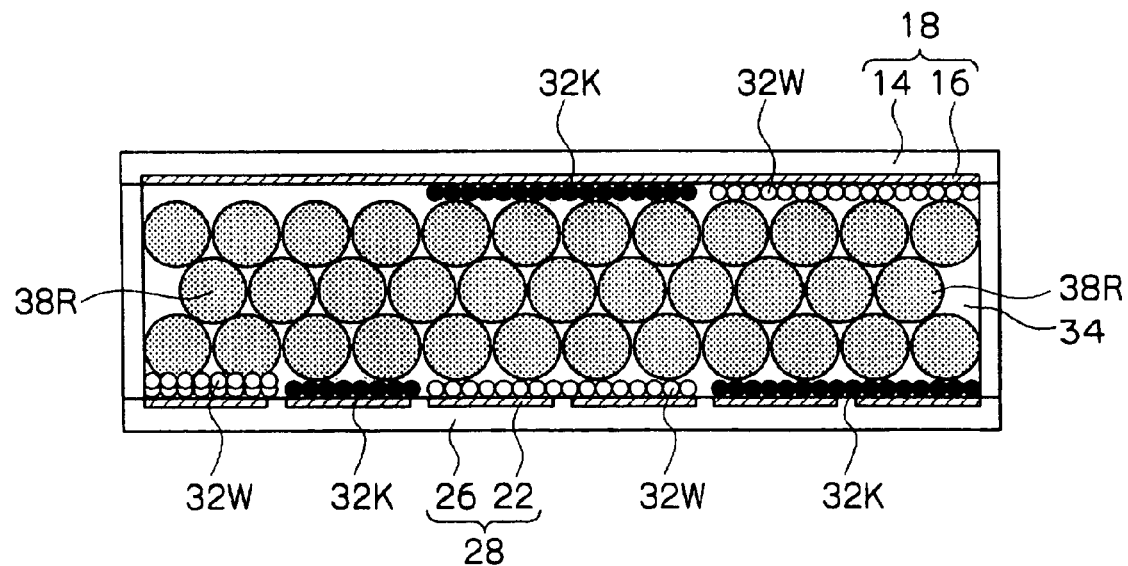
FIG. 25 is a schematic diagram showing another example of a combination of colors of the moving particles and the colored member of the image display medium in the case of black-and-white display.

The form shown in FIG. 25 is a form combining large-diameter red particles 38R as the colored member, and the black particles 32K and the white particles 32W as the moving particles.

Further, for example, in the case of color display, the region between the substrates may be sectioned into at least three cells, and the combinations of the chromatic colors of the moving particles and the colored member in the three cells may be combinations of red, green and blue, or combinations of yellow, magenta, and cyan.

Concretely, for example, color display of red, green and blue, or color display of yellow, magenta and cyan are possible as shown in FIGS. 26 through 29.

Figure 26:
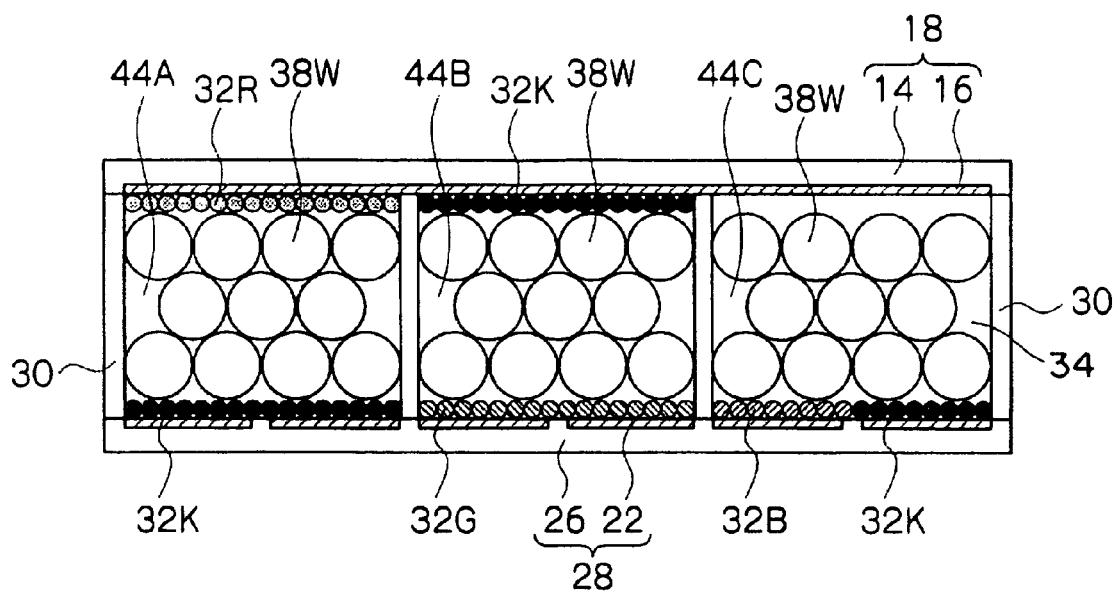
FIG. 26 is a schematic diagram showing an example of a combination of colors of the moving particles and the colored member of the image display medium in the case of color display.

The form shown in FIG. 26 is a form in which, in a first cell 44A, the black particles 32K and the red particles 32R are used as the moving particles and the large-diameter white particles 38W are used as the colored member, and in a second cell 44B, the black particles 32K and green particles 32G are used as the moving particles and the large-diameter white particles 38W are used as the colored member, and in a third cell 44C, the black particles 32K and blue particles 32B are used as the moving particles and the large-diameter white particles 38W are used as the colored member.

Figure 27:
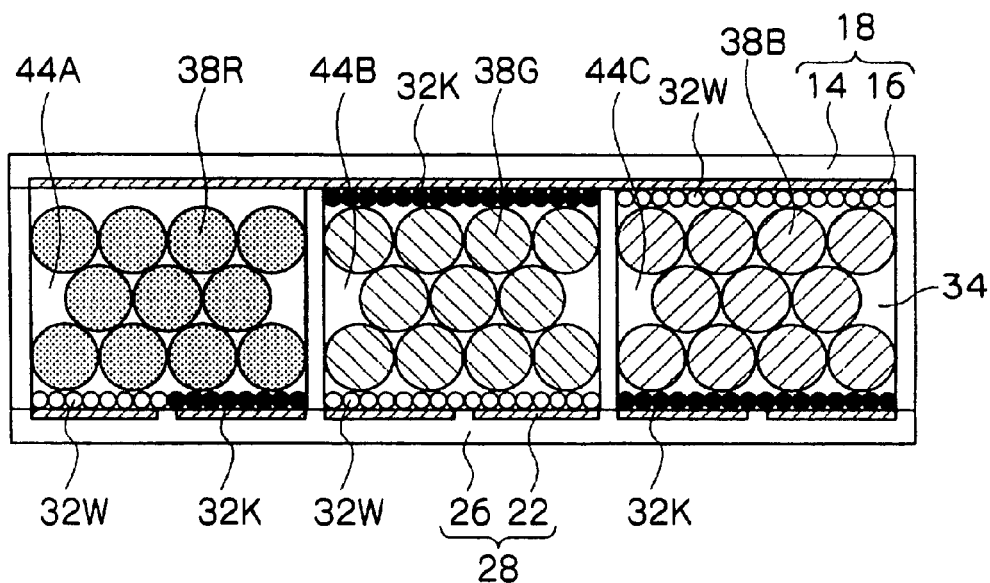
FIG. 27 is a schematic diagram showing another example of a combination of colors of the moving particles and the colored member of the image display medium in the case of color display.

The form shown in FIG. 27 is a form in which, in the first cell 44A, the black particles 32K and the white particles 32W are used as the moving particles and large-diameter red particles 38R are used as the colored member, and in the second cell 44B, the black particles 32K and the white particles 32W are used as the moving particles and large-diameter green particles 38G are used as the colored member, and in the third cell 44C, the black particles 32K and the white particles 32W are used as the moving particles and large-diameter blue particles 38B are used as the colored member.

Figure 28:
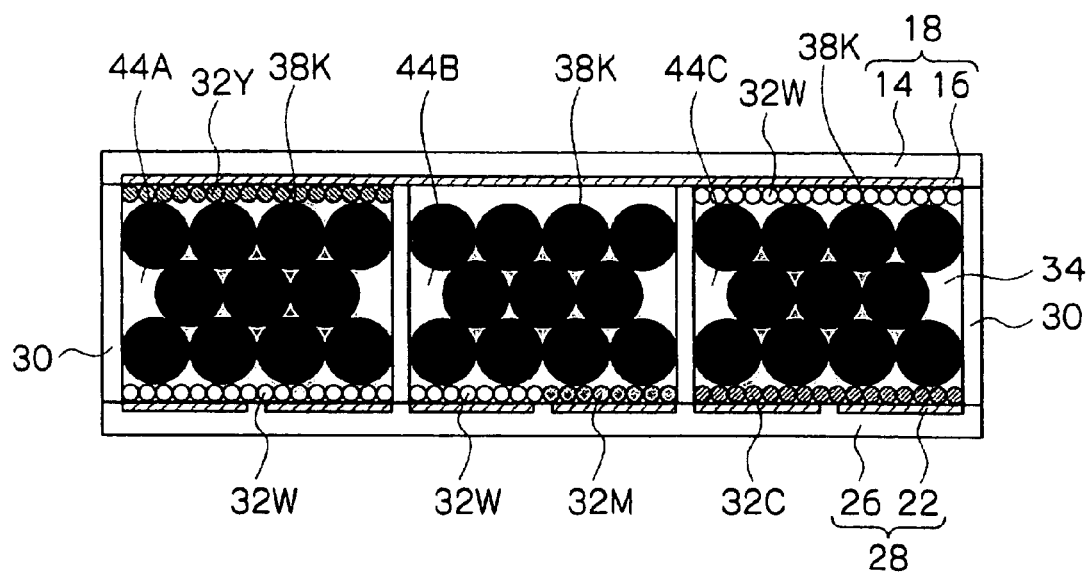
FIG. 28 is a schematic diagram showing yet another example of a combination of colors of the moving particles and the colored member of the image display medium in the case of color display.

The form shown in FIG. 28 is a form in which, in the first cell 44A, the white particles 32W and yellow particles 32Y are used as the moving particles and the large-diameter black particles 38K are used as the colored member, and in the second cell 44B, the white particles 32W and magenta particles 32M are used as the moving particles and the large-diameter black particles 38K are used as the colored member, and in the third cell 44C, the white particles 32W and cyan particles 32C are used as the moving particles and the large-diameter black particles 38K are used as the colored member.

Figure 29:
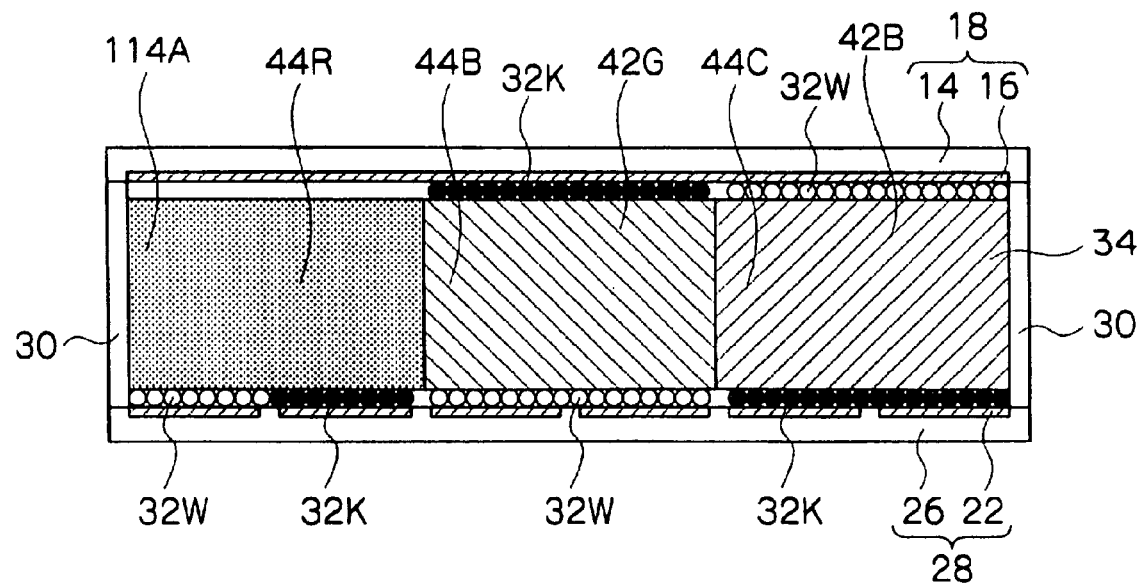
FIG. 29 is a schematic diagram showing still another example of a combination of colors of the moving particles and the colored member of the image display medium in the case of color display.

The form shown in FIG. 29 is a form in which, in the first cell 44A, the black particles 32K and the white particles 32W are used as the moving particles and a red porous member 42R is used as the colored member, and in the second cell 44B, the black particles 32K and the white particles 32W are used as the moving particles and a green porous member 42G is used as the colored member, and in the third cell 44C, the black particles 32K and the white particles 32W are used as the moving particles and a blue porous member 42B is used as the colored member.

In the above-described exemplary embodiment, no particular description is given of the display driving method. However high-speed, high-contrast display may be carried out by a known technique, for example, by simple matrix driving in which plural line electrodes and column electrodes are disposed and the column electrodes are driven all at once in accordance with image information corresponding to the respective line electrodes while scan-driving the line electrodes, or by active matrix driving by pixel electrodes that are disposed at respective pixels such as TFT or the like.

Further, the above exemplary embodiment describes a form in which electrodes are placed on a substrate and display driving is carried out. However, a form may be utilized in which display driving is carried out by external electrodes that are provided separately from the image display medium.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display medium comprising:
a display substrate that is at least transparent;
a back substrate opposing the display substrate with a gap therebetween;
at least two or more kinds of moving particle groups that are chargeable and that are different colors, the moving particle groups being enclosed between the display substrate and the back substrate and moving between the substrates in accordance with an electric field formed between the substrates;
a transparent liquid for dispersing the moving particles, the transparent liquid being enclosed between the display substrate and the back substrate; and
a colored member disposed between the display substrate and the back substrate, and having gaps through which the moving particle groups can move, and being a color that is different from the colors of the moving particle groups,
wherein the colored member is structured by a colored particle group whose particles have a volume average particle diameter larger than a volume average particle diameter of particles of the moving particle groups, and
wherein a size of the particles of the colored particle group structuring the colored member is greater than or equal to 10 times the size of the particles of the moving particle groups.

2. The image display medium of claim 1, wherein a transparent porous member, which has through-holes through which the moving particle groups can move, is disposed between the display substrate and the colored particle group structuring the colored member.

3. The image display medium of claim 1, wherein the colored member is structured by a porous member having through-holes through which the moving particle groups can move.

4. The image display medium of claim 1, wherein the colored member is disposed so as to abut the display substrate.

5. The image display medium of claim 1, wherein the colored member is disposed with a gap between the colored member and the display substrate.

6. The image display medium of claim 1, wherein the colored member moves in accordance with an electric field formed between the substrates.

7. The image display medium of claim 1, wherein a color of the colored member is white, and, when there are two kinds of the moving particle groups, the colors thereof are black and a chromatic color.

8. The image display medium of claim 1, wherein a color of the colored member is black, and, when there are two kinds of the moving particle groups, the colors thereof are white and a chromatic color.

9. The image display medium of claim 1, wherein a color of the colored member is a chromatic color, and, when there are two kinds of the moving particle groups, the colors thereof are white and black.

10. The image display medium of claim 1, wherein, when the image display medium is sectioned into at least three cells, combinations of chromatic colors of the moving particles and the colored member in the three cells are combinations of red, green and blue, or combinations of yellow, magenta and cyan.

11. An image display device comprising:
the image display medium of claim 1;
a first electrode disposed at a display substrate side;
a second electrode disposed at a back substrate side; and
voltage applying unit for applying voltage between the first electrode and the second electrode and forming an electric field between the substrates.

12. An image display medium comprising:
a display substrate that is at least transparent;
a back substrate opposing the display substrate with a gap therebetween;
at least two or more kinds of moving particle groups that are chargeable and that are different colors, the moving particle groups being enclosed between the display substrate and the back substrate and moving between the substrates in accordance with an electric field formed between the substrates;
a transparent liquid for dispersing the moving particles, the transparent liquid being enclosed between the display substrate and the back substrate; and
a colored member disposed between the display substrate and the back substrate, and having gaps through which the moving particle groups can move, and being a color that is different from the colors of the moving particle groups,
wherein the colored member is structured by a colored particle group whose particles have a volume average particle diameter larger than a volume average particle diameter of particles of the moving particle groups, and
wherein a surface roughness of the particles of the colored particle group structuring the colored member is greater than the volume average particle diameter of the moving particle groups.

13. An image display medium comprising:
a display substrate that is at least transparent;
a back substrate opposing the display substrate with a gap therebetween;
at least two or more kinds of moving particle groups that are chargeable and that are different colors, the moving particle groups being enclosed between the display substrate and the back substrate and moving between the substrates in accordance with an electric field formed between the substrates;
a transparent liquid for dispersing the moving particles, the transparent liquid being enclosed between the display substrate and the back substrate; and
a colored member disposed between the display substrate and the back substrate, and having gaps through which the moving particle groups can move, and being a color that is different from the colors of the moving particle groups,
wherein the colored member is structured by a colored particle group whose particles have a volume average particle diameter larger than a volume average particle diameter of particles of the moving particle groups, and
wherein the particles of the colored particle group structuring the colored member have attached thereto accessory particles whose the volume average particle diameter is smaller than the volume average particle diameter of the particles of the colored particle group and greater than the volume average particle diameter of the particles of the moving particle groups.

14. The image display medium of claim 13, wherein the the accessory particles are attached to the colored particle group at a covering ratio of 1% to 30%.

* * * * *